United States Patent
Whitney et al.

(10) Patent No.: US 8,626,411 B2
(45) Date of Patent: Jan. 7, 2014

(54) DRIVELINE STIFFNESS CONTROL SYSTEMS AND METHODS

(75) Inventors: Christopher E. Whitney, Highland, MI (US); William L. Aldrich, III, Davisburg, MI (US); Jeffrey M. Kaiser, Highland, MI (US); Daniel J. Wickman, Plymouth, MI (US); Scott A. Hearld, Waterford, MI (US)

(73) Assignee: GM Global Technology Operations LLC

( * ) Notice: Subject to any disclaimer, the term of this patent is extended or adjusted under 35 U.S.C. 154(b) by 707 days.

(21) Appl. No.: 12/695,576

(22) Filed: Jan. 28, 2010

(65) Prior Publication Data
US 2011/0112734 A1    May 12, 2011

Related U.S. Application Data

(60) Provisional application No. 61/260,198, filed on Nov. 11, 2009.

(51) Int. Cl.
*G06F 7/00* (2006.01)
*G06F 17/00* (2006.01)
*G06F 7/70* (2006.01)

(52) U.S. Cl.
USPC ............................................. 701/54; 701/51

(58) Field of Classification Search
USPC ................................................... 701/54
See application file for complete search history.

(56) References Cited

U.S. PATENT DOCUMENTS

| 6,487,489 B2* | 11/2002 | Schmitt et al. | 701/93 |
| 7,324,888 B1* | 1/2008 | Stotsky et al. | 701/101 |
| 2009/0239707 A1* | 9/2009 | Albertson et al. | 477/174 |
| 2009/0287378 A1* | 11/2009 | Jess et al. | 701/48 |

* cited by examiner

*Primary Examiner* — M. Thein (57) ABSTRACT

A control system for a vehicle, comprises a torque determination module, a control module, and a transmission control module. The torque determination module determines torque produced by an internal combustion engine. The control module sets a signal to an active state when the torque is greater than a predetermined torque and a slip amount between an engine output speed and a transmission input speed is zero. The predetermined torque corresponds to a potential vibration amount when the slip amount is zero. The transmission control module selectively increases the slip amount above zero in response to the setting of the signal to the active state.

16 Claims, 7 Drawing Sheets

DRIVELINE STIFFNESS CONTROL SYSTEMS AND METHODS

CROSS-REFERENCE TO RELATED APPLICATIONS

This application claims the benefit of U.S. Provisional Application No. 61/260,198, filed on Nov. 11, 2009. The disclosure of the above application is incorporated herein by reference in its entirety.

FIELD

The present disclosure relates to internal combustion engine systems and more particularly to vehicle drivelines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into spark-ignition engines is regulated via a throttle. More specifically, the throttle adjusts throttle area, which increases or decreases airflow into the engine. As the throttle area increases, the airflow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A control system for a vehicle, comprises a torque determination module, a control module, and a transmission control module. The torque determination module determines torque produced by an internal combustion engine. The control module sets a signal to an active state when the torque is greater than a predetermined torque and a slip amount between an engine output speed and a transmission input speed is zero. The predetermined torque corresponds to a potential vibration amount when the slip amount is zero. The transmission control module selectively increases the slip amount above zero in response to the setting of the signal to the active state.

A control method for a vehicle comprises: determining torque produced by an internal combustion engine; setting a signal to an active state when the torque is greater than a predetermined torque and a slip amount between an engine output speed and a transmission input speed is zero, wherein the predetermined torque corresponds to a potential vibration amount when the slip amount is zero; and selectively increasing the slip amount above zero in response to the setting of the signal to the active state.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine combusts a mixture of air and fuel to produce torque. Torque output by the engine may be transferred to a transmission via a torque converter. The torque converter may control torque transfer between the engine and the transmission. More specifically, the torque converter may be controlled to regulate a slip amount. The slip amount may refer to a speed difference between an engine output speed and a transmission input speed.

Generally, the torque converter may be controlled to maintain the slip amount at zero to minimize fuel consumption. Under some circumstances, however, vibration may be experienced while the slip amount is zero. For example only, vibration may be experienced when an engine output torque is greater than a predetermined torque at which vibration may be experienced.

A controller according to the present disclosure estimates the engine output torque and selectively increases the slip amount when the torque exceeds the predetermined torque. In this manner, the controller controls the torque converter to prevent vibration that may otherwise be experienced if the slip amount was zero.

Figure 1A:
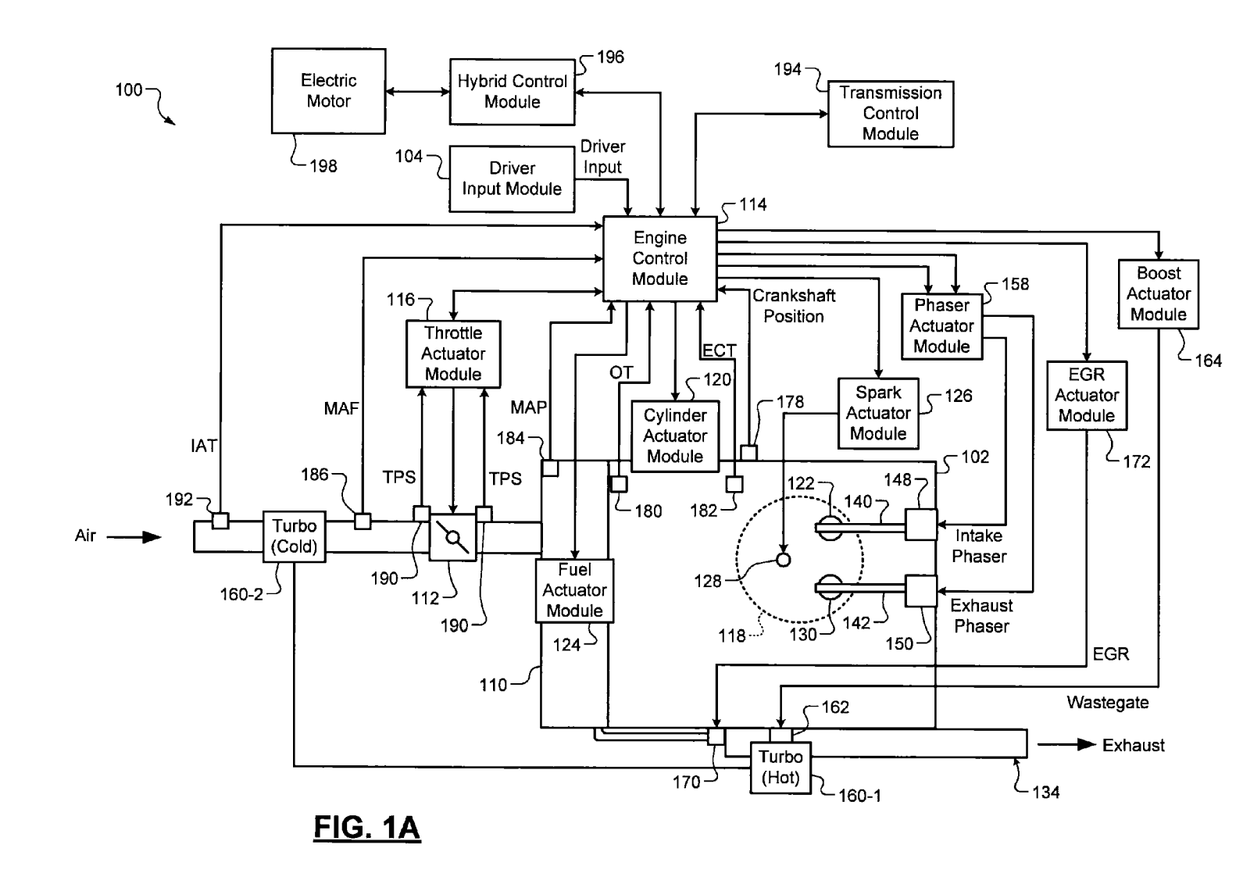
FIGS. 1A-1B are functional block diagrams of exemplary engine systems according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cylinder cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve actuation (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure position of the crankshaft using a crankshaft position sensor 178. Temperature of engine oil may be measured using an oil temperature (OT) sensor 180. Temperature of engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flowrate (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from one or more of the sensors to make control decisions for the engine system 100.

Figure 1B:
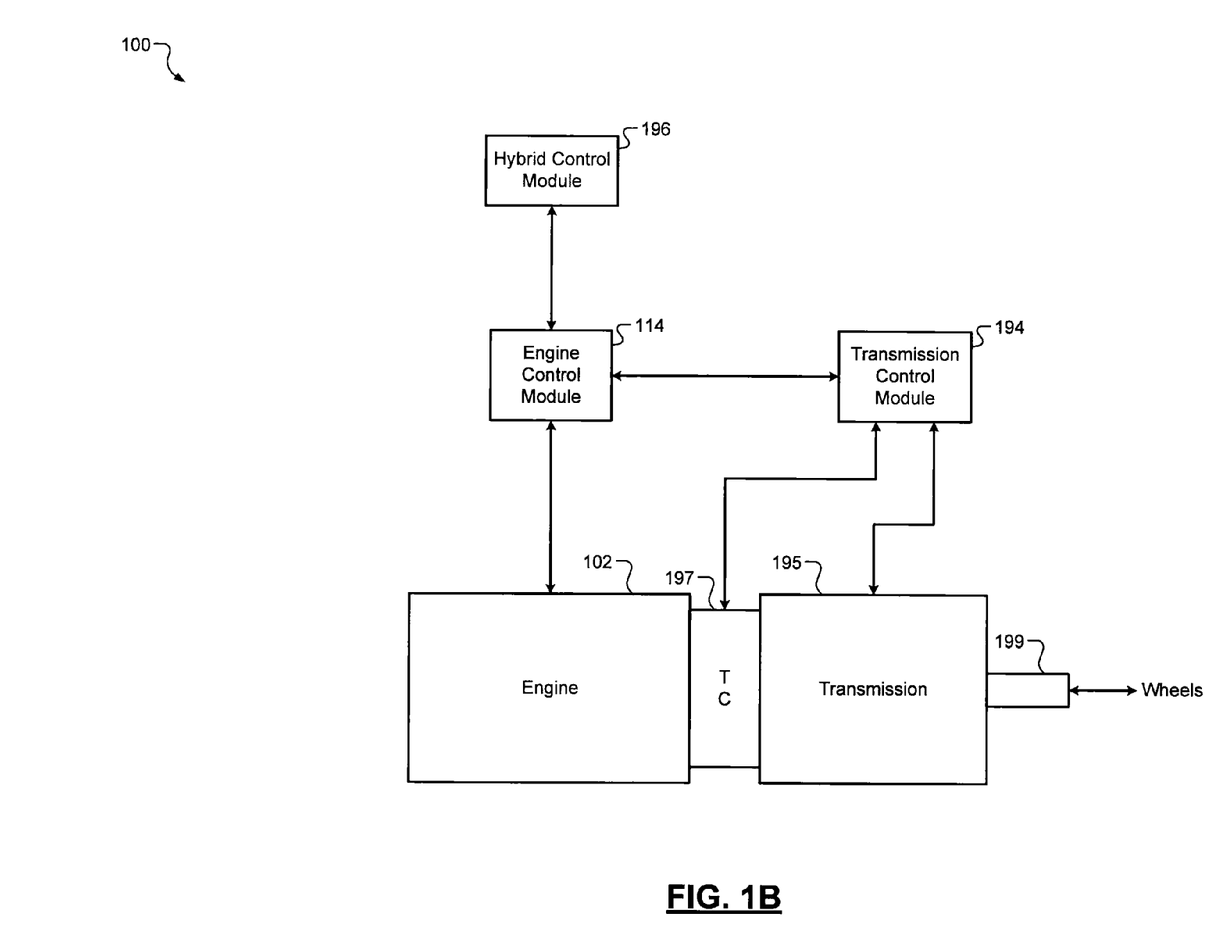

The ECM 114 may communicate with a transmission control module 194 to coordinate shifting gears (and more specifically gear ratio) selected a transmission 195 (see FIG. 1B). For example, the ECM 114 may reduce engine torque during a gear shift. The ECM 114 may also communicate with a hybrid control module 196 to coordinate operation (i.e., torque output production) of the engine 102 and an electric motor 198.

The electric motor 198 may also function as a generator, and may be used to produce electrical energy for use by vehicle electrical systems and/or for storage in an energy storage device (e.g., a battery). The production of electrical energy may be referred to as regenerative braking. The electric motor 198 may apply a braking (i.e., negative) torque on the engine 102 to perform regenerative braking. The engine system 100 may also include one or more additional electric motors. In various implementations, various functions of the ECM 114, the transmission control module 194, and the hybrid control module 196 may be integrated into one or more modules.

Each system that varies an engine parameter may be referred to as an engine actuator. Each engine actuator receives an associated actuator value. For example, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these engine actuators, the associated actuator values may include to number of activated cylinders, fueling rate, intake and exhaust cam phaser angles, boost pressure, and EGR valve opening area, respectively. The ECM 114 may control actuator values in order to cause the engine 102 to generate a desired engine output torque.

Referring now to FIG. 1B, the engine 102 may transfer torque to the transmission 195 via a torque converter 197. The torque converter 197 may include a torque converter clutch (not shown) that may be selectively actuated to couple and de-couple the engine and the transmission 195. The torque converter 197 may be said to be in a locked state when the torque converter clutch is actuated to couple the engine 102 and the transmission 195.

Under some circumstances, the torque converter 197 may be controlled to create a condition referred to as slip. Slip may be said to occur when an input shaft (not shown) of the transmission 195 slips (i.e., slows) with respect to an output shaft of the engine 102 (e.g., the crankshaft). In other words, slip may be said to occur when the torque converter 197 is controlled to allow a transmission input speed to become slower than an engine output speed. The torque converter 197 may be said to be in the unlocked state when the slip amount reaches a predetermined maximum slip amount. For example only, the predetermined maximum slip amount may be approximately 1000 rpm. Conversely, the torque converter 197 may be said to be in the locked state when the slip amount is zero.

The transmission control module 194 may control actuation of the torque converter 197. The transmission control module 194 may also control the gear ratio that is selected (i.e., engaged) within the transmission 195 and other parameters. The transmission control module 194 may selectively communicate data to the ECM 114, such as the gear ratio.

Based on the gear ratio selected within the transmission 195, torque may be transferred to a driveline 199, which selectively transfers torque to one or more wheels of the vehicle. For example only, the driveline 199 may include one or more axles, one or more differentials, and other suitable components. The transmission control module 194 and the ECM 114 may control the engine 102, the transmission 195, and/or the torque converter 197 to, among other things, minimize vibration experienced within a passenger cabin of the vehicle.

Figure 2A:
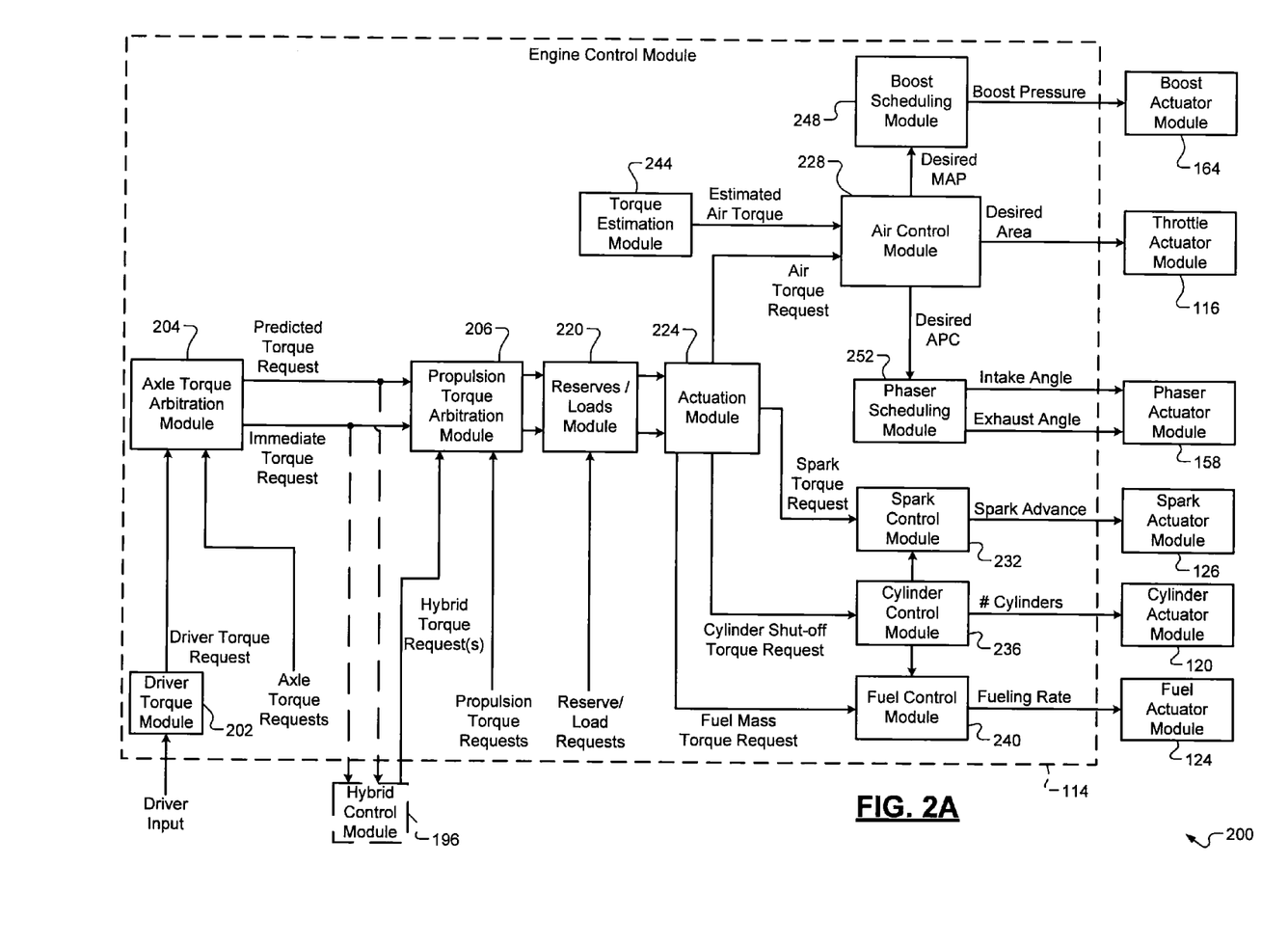
FIGS. 2A-2B are functional block diagrams of exemplary engine control systems according to the principles of the present disclosure.

Referring now to FIG. 2A, a functional block diagram of an exemplary engine control system 200 is presented. An exemplary implementation of the ECM 114 includes a driver torque module 202. The driver torque module 202 may determine a driver torque request based on driver input(s) from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to driver torque request, and may determine the driver torque request based on a selected one of the mappings.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases. Each torque request may include data indicating the system or module that generated that torque request (i.e., the requestor).

Axle torque requests may include a torque reduction requested by a traction control system when positive wheel slip is detected. Positive wheel slip occurs when axle torque overcomes friction between the wheels and the road surface, and the wheels begin to slip against the road surface in a forward direction. Axle torque requests may also include a torque increase request to counteract negative wheel slip, where a tire of the vehicle slips in a reverse direction with respect to the road surface because the axle torque is negative.

Axle torque requests may also include brake management requests and vehicle over-speed torque requests. Brake management requests may reduce the engine output torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules before being used to control actuators of the engine 102.

In general terms, the immediate torque request is the amount of currently desired engine output torque, while the predicted torque request is the amount of engine output torque that may be needed on short notice. The ECM 114 therefore controls the engine 102 to produce an engine output torque equal to the immediate torque request. However, different combinations of actuator values may result in the same engine output torque. The ECM 114 may therefore control the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing positive wheel slip on an icy (i.e., low coefficient of friction) surface. In such a case, a traction control system (not shown) may request a reduction via the immediate torque request, and the ECM 114 reduces the torque produced by the engine 102 to the immediate torque request. However, the ECM 114 controls the engine actuators so that the engine 102 can quickly resume producing the predicted torque request once the positive wheel slip stops.

In general terms, the difference between the immediate torque request and the predicted torque request can be referred to as a torque reserve. The torque reserve represents the amount of torque more than the immediate torque request that the engine 102 can begin to produce with minimal delay. Fast engine actuators are used to increase or decrease the engine output torque. As described in more detail below, fast engine actuators are defined based on their ability to produce a response in the engine output torque relative to slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque capacity of the fast engine actuators.

For example only, fast engine actuators may only be able to reduce engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests the predicted torque request to be output, the fast engine actuators can be controlled to vary the engine output torque to the upper limit of the range, which is the predicted torque request.

In general terms, fast engine actuators can change the engine output torque more quickly than slow engine actuators can. Slow engine actuators may respond more slowly to changes in their respective actuator values than fast engine actuators do. For example, a slow engine actuator may include mechanical components that require time to move from one position to another in response to a change in the associated actuator value.

A slow engine actuator may also be characterized by the amount of time it takes for the engine output torque to begin to change once the slow engine actuator begins to implement the changed actuator value. Generally, this amount of time will be longer for slow engine actuators than for fast engine actuators. In addition, even after the engine output torque begins to change, the engine output torque may take longer to reach an engine output torque that is expected to result from the changed actuator value.

For example only, the ECM 114 may set actuator values for slow engine actuators to values that would enable the engine 102 to produce the predicted torque request if the fast engine actuators were set to appropriate values. Meanwhile, the ECM 114 may set actuator values for fast engine actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values associated with one or more fast engine actuators to values that correspond to the predicted torque request. Because the actuator values associated with the slow engine actuators have already been set based on the predicted torque request, the engine 102 is able to produce the predicted torque request after only the delay attributable to the fast engine actuators. In other words, the longer delay that would otherwise result from changing engine output torque using slow engine actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request.

The resulting torque reserve can be used to offset sudden increases in required engine output torque. For example only, sudden loads from an air conditioner or a power steering pump may be offset by increasing the immediate torque request. If the increase in immediate torque request is less than the torque reserve, the increase can be quickly produced by using fast engine actuators. The predicted torque request may then also be increased to re-establish the previous torque reserve.

Another exemplary use of a torque reserve is to reduce fluctuations in slow actuator values. Because of their relatively slow speed, varying slow actuator values may produce control instability. In addition, slow engine actuators may include mechanical parts, which may draw more power and/or wear more quickly when moved frequently.

Creating a sufficient torque reserve allows changes in desired torque to be made by varying fast engine actuators via the immediate torque request while maintaining the values of the slow engine actuators. For example only, to maintain a given idle speed, the immediate torque request may vary within a range. If the predicted torque request is set to a level above this range, variations in the immediate torque request that maintain the idle speed can be made using fast engine actuators without the need to adjust slow engine actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change spark timing for the following firing event. When the spark timing (also called spark advance) for a firing event is set to a calibrated value, a maximum torque is produced in the combustion stroke immediately following the firing event.

However, a spark advance deviating from the calibrated value may reduce the amount of torque produced in the combustion stroke. Therefore, the spark actuator module 126 may be able to vary engine output torque as soon as the next firing event occurs by varying the spark timing. For example only, a table of spark timings corresponding to different engine operating conditions may be determined during a calibration phase of vehicle design, and the calibrated value is selected from the table based on current engine operating conditions.

By contrast, changes in throttle opening area take longer to affect the engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, airflow changes based on the throttle valve opening are subject to air transport delays in the intake manifold 110. Further, increased airflow into the intake manifold 110 is not realized as an increase in engine output torque until the cylinder 118 receives additional air in the next intake stroke, compresses the additional air, and commences the combustion stroke.

Using the throttle opening area and the spark timing in an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough airflow for the engine 102 to produce the predicted torque request, the spark timing is retarded (which reduces the engine output torque) based on the immediate torque request. The engine output torque will therefore be equal to the immediate torque request.

When additional torque is needed, such as when the air conditioning compressor is engaged, or when traction control determines that wheel slip has ended, the spark timing can be set based on the predicted torque request. By the following firing event, the spark actuator module 126 may return the spark timing to a calibrated value, which allows the engine 102 to produce the maximum engine output torque. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. Depending on the type of hybrid vehicle, the axle torque arbitration module 204 may output the predicted and immediate torque requests to the hybrid control module 196.

The predicted and immediate torque requests received by the propulsion torque arbitration module 206 are converted from an axle torque domain (torque at the wheels) into a propulsion torque domain (torque at the crankshaft). In some implementations, the predicted and immediate torque requests may be converted into the propulsion torque domain before being provided to the propulsion torque arbitration module 206. In some implementations, the predicted and immediate torque requests in the propulsion torque domain may be provided to the hybrid control module 196. The hybrid control module 196 may control the electric motor 198 based on one or more of the torque requests and may provide modified predicted and immediate torque requests to the propulsion torque arbitration module 206.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request based on the arbitration. The arbitrated torque requests may be generated by selecting a winning request from among received requests. Alternatively or additionally, the arbitrated torque requests may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. The other propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other requestors may be informed that they have lost arbitration.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads imposed on the engine 102. The reserves/loads module 220 then outputs the adjusted predicted and immediate torque requests to an actuation module 224.

The actuation module 224 receives the predicted and immediate torque requests from the reserves/loads module 220. The actuation module 224 determines how the predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow engine actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast engine actuator. However, spark timing may not provide as much range of torque control. In addition, the amount of torque control possible with changes in spark timing (referred to as spark reserve capacity) may vary as one or more airflow conditions change.

In various implementations, the actuation module 224 may generate an air torque request based on the predicted torque request. The air torque request may be equal to the predicted torque request, thereby controlling engine airflow actuators so that the adjusted predicted torque request can be rapidly achieved by adjusting one or more actuator values associated with fast engine actuators.

An air control module 228 may determine desired actuator values for the engine airflow actuators based on the air torque request. For example, the air control module 228 may determine a desired manifold absolute pressure (MAP), a desired throttle area, and/or a desired air per cylinder (APC). The desired MAP may be used to determine desired boost, and the desired APC may be used to determine desired cam phaser positions. In various implementations, the air control module 228 may also determine a desired opening of the EGR valve 170 and other engine airflow parameters.

The actuation module 224 may also generate a spark torque request, a cylinder shut-off torque request, and a fuel mass torque request. For example only, the actuation module 224 may generate the spark torque request, the cylinder shut-off torque request, and/or the fuel mass torque request based on the immediate torque request.

The spark torque request may be used by a spark control module 232 to determine how much to retard the spark timing (which reduces the engine output torque) from a calibrated spark advance. The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current APC. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease engine output torque. The fuel control module 240 may then determine a fuel mass for each cylinder that achieves the desired air/fuel ratio. In diesel systems, fuel mass may be the primary actuator for controlling engine output torque.

A torque estimation module 244 may estimate torque output of the engine 102. This estimated torque may be used by the air control module 228 to perform closed-loop control of the engine airflow parameters, such as the throttle area, the MAF, the MAP, the APC, and the phaser positions. For example only, a torque relationship such as:

$$T=f(APC,S,I,E,AF,OT,\#) \quad (1)$$

may be defined, where torque (T) is a function of mass of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine the APC based on the MAF and the RPM, thereby allowing closed-loop control of the engine airflow parameters control based on current engine airflow conditions. The intake and exhaust cam phaser positions used may be based on actual positions, as the phasers may be traveling toward desired positions.

The torque estimation module 244 may use the actual spark advance to estimate the engine output torque. When a calibrated spark advance value is used to estimate the engine output torque, the estimated torque may be called an estimated air torque, or simply air torque. The air torque is an estimate of how much torque the engine 102 could generate with the current airflow conditions if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed-loop control of the engine airflow actuators. For example, the desired area signal may be controlled to minimize a difference between the estimated air torque and the air torque request.

The air control module 228 may output a desired MAP signal to a boost scheduling module 248. The boost scheduling module 248 may use the desired MAP signal to control the boost actuator module 164. The boost actuator module 164 then controls one or more turbochargers (e.g., the turbocharger including the turbine 160-1 and the compressor 160-2) and/or superchargers. The desired MAP may also be used by the throttle actuator module 116 in controlling the throttle valve 112.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on the relationship $$S_{des} = T^{-1}(T_{des}, APC, I, E, AF, OT, \#) \quad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to a mean best torque (MBT) as possible. MBT refers to the maximum engine output torque that is achievable for a given engine airflow conditions as spark advance is increased, while using fuel having an octane rating greater than a predetermined octane rating and using stoichiometric fueling. The spark advance at which the MBT occurs is referred to as MBT spark timing. The calibrated spark advance may differ slightly from MBT spark timing because of, for example, fuel quality (such as when lower octane fuel is used) and environmental factors. The engine output torque produced using the calibrated spark advance may therefore be less than the MBT.

Figure 2B:
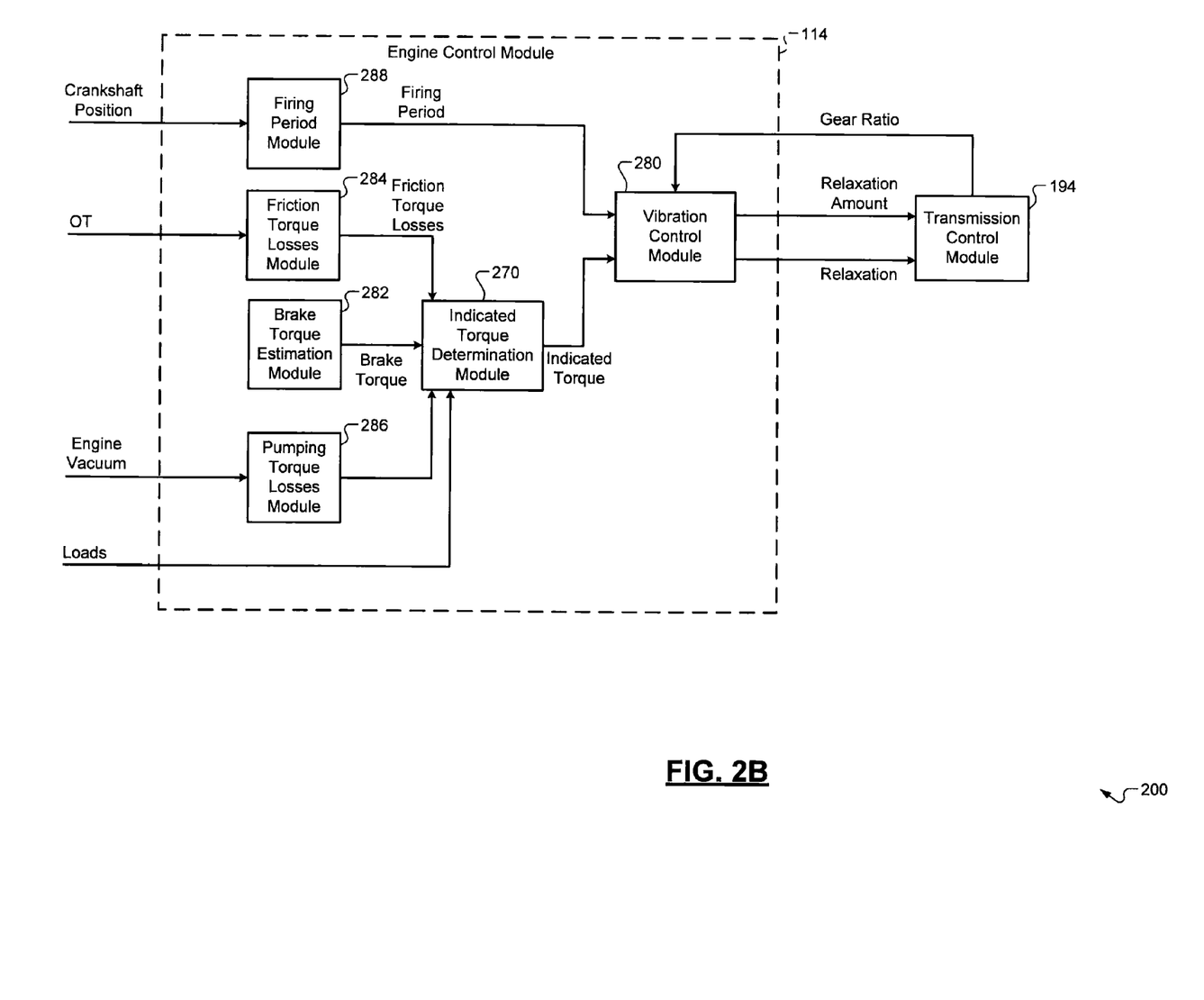

Referring now to FIG. 2B, the exemplary ECM 114 may also include an indicated torque determination module 270 and a vibration control module 280. The indicated torque determination module 270 determines an indicated torque (Nm) of the engine 102. The indicated torque may correspond to torque produced via combustion events within the engine 102.

The indicated torque determination module 270 may determine the indicated torque based on a brake torque, pumping torque losses, friction torque losses, and the loads. For example only, the indicated torque determination module 270 may determine the indicated torque as a sum of the brake torque, the pumping torque losses, the friction torque losses, and the accessory loads. In other implementations, the indicated torque determination module 270 may determine the indicated torque using a model. For example only, the indicated torque determination module 270 may determine the indicated torque based on a model that outputs the indicated torque as a function of inputs that influence combustion characteristics of the engine 102, such as engine airflow parameters, engine speed, spark timing, and other suitable inputs.

A brake torque estimation module 282 may estimate the brake torque. The brake torque may correspond to torque at a flywheel (or crankshaft) that may be used by the propulsion system. For example only, the propulsion system may use torque at the flywheel to drive the transmission 195, the driveline 199, the wheels, etc. The brake torque may also be referred to as crankshaft torque. In operation, the brake torque is the torque that is transferred from the engine 102 to the torque converter 197. The torque converter 197 may multiply the brake torque if the slip amount is greater than zero and provide torque to the transmission 195. The transmission 195 may also multiply the torque (based on the gear ratio) and provide torque to the driveline 199. The driveline 199 may further multiply the torque (based on a final drive ratio) before the torque is provided to axles to be transferred to one or more of the wheels.

The brake torque estimation module 282 may estimate the brake torque based on a base brake torque and various adjustments. The base brake torque may be the brake torque experienced when the engine 102 is warm and when no accessory loads are being imposed. The engine 102 may be deemed warm, for example, based on the OT and the ECT. For example only, the engine 102 may be deemed warm when the OT and the ECT are greater than predetermined temperatures.

The brake torque estimation module 282 may estimate the brake torque by adjusting the base brake torque based on an engine friction adjustment and an accessory load adjustment. For example only, the brake torque estimation module 282 may estimate the brake torque by subtracting the engine friction adjustment and the accessory load adjustment from the base brake torque. The engine friction adjustment (e.g., Nm) may be determined based on the ECT and/or the OT. For example only, the engine friction adjustment may increase (resulting in a lower brake torque) as the ECT and/or the OT decrease. The accessory load adjustment (e.g., Nm) may be determined based on the accessory loads or may be equal to the accessory loads.

A friction torque losses module 284 may estimate the friction torque losses (Nm). The friction torque losses may correspond to torque losses attributable to friction. The friction torque losses module 284 may determine the friction torque losses based on, for example, the OT. For example only, the friction torque losses may increase as the OT decreases.

A pumping torque losses module 286 may estimate the pumping torque losses (Nm). The pumping torque losses may correspond to torque losses associated with engine pumping. More specifically, the pumping torque losses may include torque losses associated with drawing air through the throttle valve 112, drawing air into the cylinders, the damping effect that the contents of the cylinders may have, and other sources of pumping torque losses. The pumping losses torque module 286 may estimate the pumping torque losses based on the engine vacuum. For example only, the pumping torque losses may increase as engine vacuum increases.

As stated above, the indicated torque determination module 270 may determine the indicated torque as a sum of the brake torque, the pumping torque losses, the friction torque losses, and the accessory loads. For example only, the accessory loads (Nm) may include torque losses attributable to accessory loads, such as the air conditioning compressor, the power steering pump, and other suitable accessory loads. In some implementations, electric motor torque may also be included in the loads. In other implementations, the indicated torque determination module 270 may sum the electric motor torque with the brake torque, the pumping torque losses, torque, the friction torque losses, and the loads in determining the indicated torque. The electric motor torque may be positive or negative.

The vibration control module 280 selectively commands the transmission control module 194 to relax a stiffness of the driveline 199 based on the indicated torque. The vibration control module 280 selectively commands the transmission control module 194 to relax the stiffness of the driveline 199 further based on the firing period.

A firing period module 288 may determine the firing period. The firing period may refer to a period of time between two consecutive combustion events. The firing period module 288 may determine the firing period based on the crankshaft position signal.

For example only, the firing period module 288 may determine that a firing event occurs each time when the crankshaft position reaches a predetermined angle of an activated cylinder. The predetermined angle may be, for example, approximately 72° before the TDC position of an activated cylinder. Accordingly, the firing period may describe the period between when the crankshaft position reaches the predetermined angle for two consecutive activated cylinders in the firing order.

The non-constant production of torque inherent in internal combustion engines may cause vibration that may be noticeable within a passenger cabin of the vehicle. The magnitude of vibration experienced may increase as the indicated torque increases due to increased pressure within cylinders from the combustion events. With a constant indicated torque, the magnitude of vibration experienced may also increase as the firing period becomes longer.

The vibration control module 280 may selectively command the transmission control module 194 to relax the stiffness of the driveline 199 in an effort to reduce or eliminate the vibration experienced. The vibration control module 280 may command the transmission control module 194 to relax the stiffness of the driveline 199 via a relaxation signal. More specifically, the vibration control module 280 may set the relaxation signal to an active state (e.g., 5 V) to command relaxation of the driveline 199. Otherwise, the relaxation signal may be set to an inactive state (e.g., 0 V).

When commanding relaxation of the driveline 199, the vibration control module 280 may also specify an amount of relaxation to be performed. The vibration control module 280 may specify the amount (e.g., level) of relaxation to be performed using a relaxation amount signal. The vibration control module 280 may specify relaxation, for example, in one of a predetermined number of relaxation amounts. For example only, the vibration control module 280 may specify one of three relaxation amounts: a first relaxation amount, a second relaxation amount, and a third relaxation amount. A greater or lesser number of relaxation amounts may be used.

When commanded by the vibration control module 280 (e.g., when the relaxation signal is set to the active state), the transmission control module 194 relaxes the stiffness of the driveline 199. The transmission control module 194 may relax the stiffness of the driveline 199 by controlling actuation of the torque converter 197. More specifically, the transmission control module 194 may control the slip amount. For example only, the transmission control module 194 may actuate the torque converter clutch to cause slip, thereby reducing torque transfer between the engine 102 and the transmission 195.

The transmission control module 194 controls the amount of relaxation based on the relaxation amount specified by the vibration control module 280. More specifically, the transmission control module 194 may control the slip amount based on the relaxation amount. For example only, for the first relaxation amount, the transmission control module 194 may control the torque converter 197 to maintain the slip amount at approximately a predetermined slip amount (rpm). The transmission control module 194 may gradually increase the slip amount until the torque converter 197 reaches the unlocked state for the second relaxation amount. The transmission control module 194 may transition the torque converter 197 to the unlocked state as quickly as possible for the third relaxation amount. In this manner, as the vibration that may potentially be experienced increases, a greater amount of relaxation may be performed to prevent such vibration from being experienced.

Figure 3:
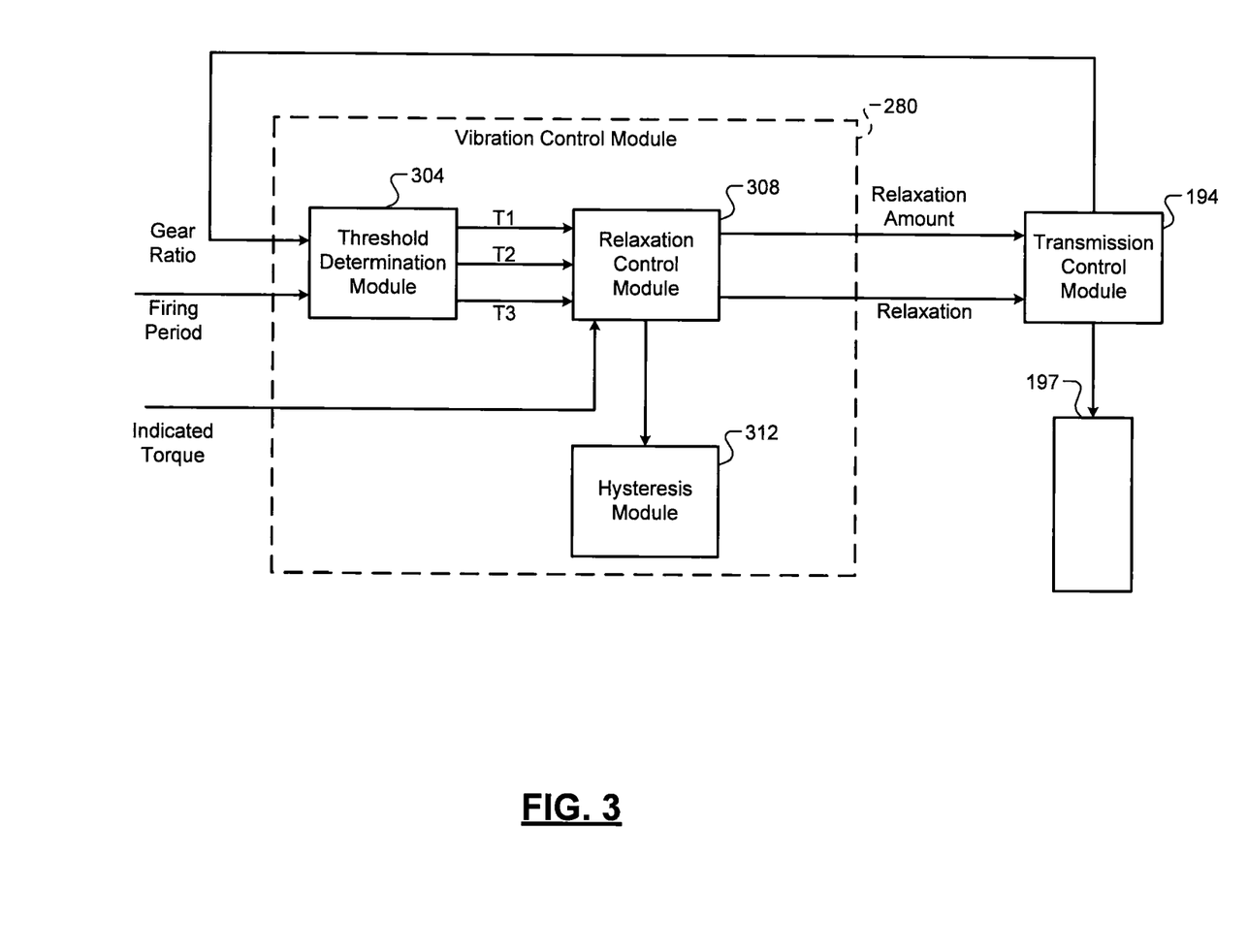
FIG. 3 is a functional block diagram of an exemplary vibration control module according to the principles of the present disclosure.

Referring now to FIG. 3, a functional block diagram of an exemplary implementation of the vibration control module 280 is presented. The vibration control module 280 may include a threshold determination module 304, a relaxation control module 308, and a hysteresis module 312.

The threshold determination module 304 may determine a torque threshold (Nm) for each of the relaxation amounts. For example only, for an implementation where three relaxation amounts are used, the threshold determination module 304 may determine three torque thresholds (shown in FIG. 1 as T1, T2, and T3). The first, second, and third torque thresholds may correspond to the first, second, and third relaxation amounts, respectively. A greater or lesser number of relaxation amounts and torque thresholds may be used.

The threshold determination module 304 may determine the torque threshold for a given relaxation amount based on the gear ratio and the firing period. The gear ratio may be used in determining the torque thresholds as some combinations of gear ratio and engine vibration may cause resonance. As described above, the firing period may also affect vibration. For example only, vibration may increase as the firing period increases. The threshold determination module 304 may receive the gear ratio and the firing period from the transmission control module 194 and the firing period module 288, respectively.

The relaxation control module 308 selectively enables and disables relaxation of stiffness of the driveline 199. The relaxation control may set the state of the relaxation signal to enable and disable the relaxation of the driveline 199. For example only, the relaxation control module 308 may set the relaxation signal to the active state to enable relaxation of the driveline 199.

When relaxation is not being performed (i.e., is disabled), the relaxation control module 308 may determine whether to enable relaxation of the driveline 199 based on a comparison of the indicated torque and one or more of the torque thresholds. For example only, the relaxation control module 308 may enable relaxation of the driveline 199 when the indicated torque is greater than the first torque threshold. In this manner, the relaxation control module 308 enables relaxation of the driveline 199 when the indicated torque is greater than at least one of the torque thresholds. The relaxation control module 308 may communicate the relaxation signal to the transmission control module 194.

The relaxation control module 308 may also determine the relaxation amount and provide the relaxation amount to the transmission control module 194. For example only, the relaxation control module 308 may determine whether the indicated torque is greater than the first, second, or third torque thresholds. The relaxation control module 308 may compare the indicated torque with the torque thresholds in a decreasing order, starting with a greatest one of the torque thresholds.

The relaxation control module 308 may set the relaxation amount based on one of the torque thresholds which the indicated torque is greater than. When the indicated torque is greater than more than one of the torque thresholds, the relaxation control module 308 may set the relaxation amount based on a greatest one of the more than one torque thresholds. For example only, when the indicated torque is greater than the third torque threshold, the relaxation control module 308 may set the relaxation amount based on the third torque threshold even though the indicated torque is also greater than the second and first torque thresholds. When the indicated torque is greater than the second torque threshold, the relaxation control module 308 may set the relaxation amount based on the second torque threshold even though the indicated torque is also greater than the first torque threshold.

The transmission control module 194 receives the relaxation signal and the relaxation amount signal and controls the torque converter 197 based on the relaxation amount. More specifically, the transmission control module 194 controls the slip amount based on the relaxation amount while the relaxation signal is in the active state.

For example only, when the relaxation amount corresponds to the first torque threshold, the transmission control module 194 may actuate the torque converter clutch based on a predetermined slip amount. The predetermined slip amount may be calibratable and may be set to, for example, approximately 30-40 rpm. In this manner, the transmission control module 194 may control the slip amount to approximately the predetermined slip amount when the indicated torque is greater than the first torque threshold.

When the relaxation amount corresponds to the second torque threshold, the transmission control module 194 may control the torque converter 197 to transition the torque converter 197 to the unlocked state in a predetermined manner. For example only, the transmission control module 194 may ramp the torque converter 197 to the unlocked state over a predetermined period when the relaxation amount corresponds to the second torque threshold. In this manner, the transmission control module 194 may gradually increase the slip amount until the torque converter 197 reaches the unlocked state when the indicated torque is greater than the second torque threshold.

When the relaxation amount corresponds to the third torque threshold, the transmission control module 194 may control the torque converter 197 to transition the torque converter 197 to the unlocked state as quickly as possible. In this manner, the transmission control module 194 may transition the torque converter 197 to the unlocked state as quickly as possible when the indicated torque is greater than the third torque threshold (i.e., when a greatest amount of vibration may be experienced).

While relaxation of the driveline 199 is being performed, the relaxation control module 308 may determine whether to disable the relaxation based on a comparison of the indicated torque and the torque threshold corresponding to the relaxation amount. However, a hysteresis torque may be applied to prevent frequent enabling and disabling of relaxation of the driveline 199 that may occur. For example only, calculation of the driver torque request may cause frequent enabling and disabling if the hysteresis torque is not applied.

The relaxation control module 308 may determine the hysteresis torque from the hysteresis module 312. The relaxation control module 308 may determine the hysteresis torque based on the relaxation amount. In some implementations, the hysteresis torques may include predetermined values. In other implementations, the hysteresis module 312 may include one or more mappings of hysteresis torques indexed by relaxation amount.

For example only, the hysteresis module 312 may include one mapping of hysteresis torque for the first relaxation amount and one mapping of hysteresis torque for the second and third relaxation amounts. In this manner, the same hysteresis torque applied when the relaxation amount corresponds to either of the second or third torque thresholds in some implementations. Different mappings may be provided for the second and third relaxation amounts. The hysteresis module 312 may also determine the hysteresis torque based on the firing period and an expected slip amount. The expected slip amount may be based on the slip amount that is expected as the transmission control module 194 transitions the torque converter 197 toward the locked state.

The relaxation control module 308 may apply the hysteresis torque by subtracting the hysteresis torque from the torque threshold associated with the relaxation amount. The torque threshold less the hysteresis torque may be referred to as a disabling torque. The relaxation control module 308 may selectively disable the relaxation of the driveline 199 based on a comparison of the disabling torque and the indicated torque. For example only, the relaxation control module 308 may disable the relaxation of the driveline 199 when the indicated torque is less than the disabling torque.

The relaxation control module 308 may set the state of the relaxation signal to the inactive state to command the transmission control module 194 to disable the relaxation of the driveline 199. The transmission control module 194 may thereafter control the torque converter 197, for example, to reduce the slip amount and transition the torque converter 197 to the locked state.

Figure 4A:
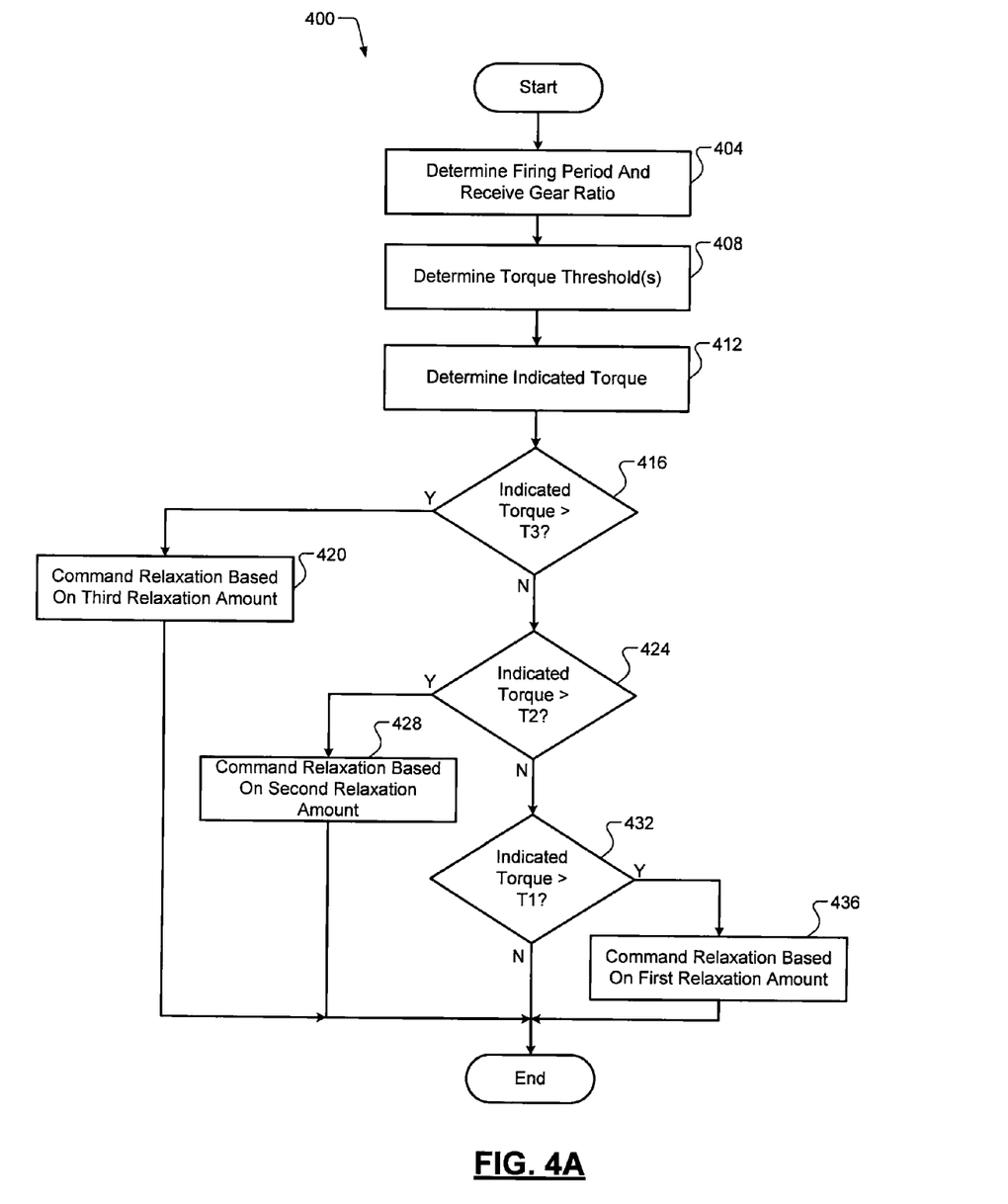
FIGS. 4A-4B is flowcharts depicting exemplary steps performed by methods according to the principles of the present disclosure.

Referring now to FIG. 4A, a flowchart depicting exemplary steps performed by a method 400 are presented. Control may begin in step 404 where control receives the gear ratio selected within the transmission 195 and determines the firing period. Control may determine the firing period based on a period between two consecutive firing events.

Control may determine one or more torque thresholds in step 408. For example only, control may determine three torque thresholds (T1, T2, and T3) in step 408 as shown and as described in conjunction with the exemplary embodiment of FIG. 4A. A greater or fewer number of torque thresholds may be determined and used. Each of the torque thresholds may correspond to an indicated torque above which vibration may be experienced within the passenger cabin of the vehicle. The amount of vibration that may be experienced may increase as the numeral label associated with the torque threshold increases. For example only, more vibration may be experienced when the indicated torque is greater than the third torque threshold than when the indicated torque is greater than the second threshold.

In step 412, control determines the indicated torque. Control may determine the indicated torque based on the brake torque, the pumping torque losses, the friction torque losses, and the loads. For example only, control may determine the indicated torque as the sum of the brake torque, the pumping torque losses, the friction torque losses, and the loads. Electric motor torque may be included as one of the loads or may be summed with the brake torque, the pumping torque losses, the friction torque losses, and the loads.

Control determines whether the indicated torque is greater than the third torque threshold (i.e., T3) in step 416. If true, control may command relaxation of the driveline 199 based on the third relaxation amount in step 420, and control may end. If false, control may continue to step 424. The torque converter 197 may be controlled to adjust the slip amount based on the third relaxation amount in response to the command. For example only, the torque converter clutch may be actuated to unlock the torque converter 197 as quickly as possible in response to the command for driveline relaxation based on the third relaxation amount.

In step 424, control may determine whether the indicated torque is greater than the second torque threshold (i.e., T2). If true, control may command relaxation of the driveline 199 based on the second relaxation amount in step 428, and control may end. If false, control may continue to step 432. The torque converter 197 may be controlled to adjust the slip amount based on the second relaxation amount in response to the command. For example only, the torque converter clutch may be controlled to transition the torque converter 197 to the unlocked state in the predetermined manner in response to the command for driveline relaxation based on the second relaxation amount. For example only, the predetermined manner may include ramp decreasing the slip amount until the torque converter 197 reaches the unlocked state.

Control may determine whether the indicated torque is greater than the first torque threshold (i.e., T1) in step 432. If true, control may command relaxation of the driveline 199 based on the first relaxation amount in step 436, and control may end. If false, control may end. The torque converter 197 may be controlled to maintain the slip amount at approximately the predetermined slip amount in response to the command for driveline relaxation based on the first relaxation amount. For example only, the predetermined slip amount may be approximately 30-40 rpm.

Figure 4B:
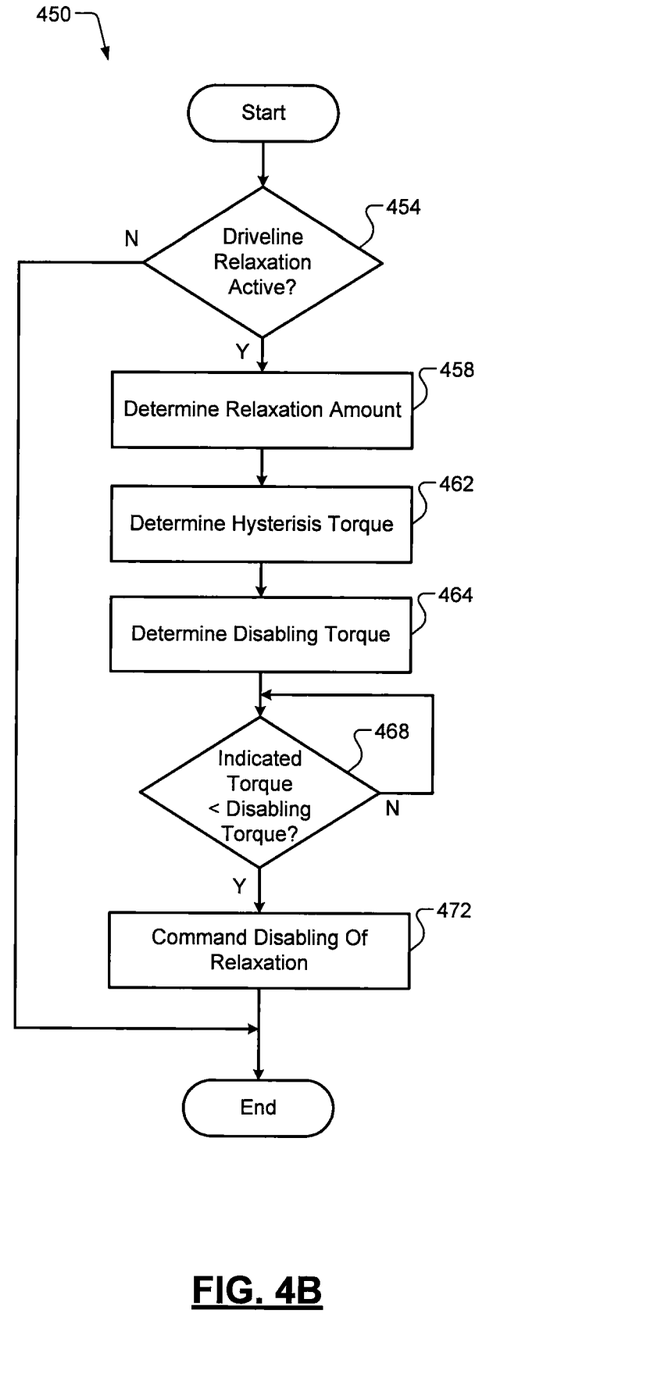

Referring now to FIG. 4B, a flowchart depicting another exemplary method 450 is presented. Control may begin in step 454 where control determines whether driveline relaxation is active (i.e., occurring). If true, control may continue to step 458; if false, control may end. In step 458, control may determine the relaxation amount (e.g., level) upon which the driveline relaxation is being performed.

In step 462, control determines the hysteresis torque based on the relaxation amount. Control may determine the hysteresis torque for the first relaxation amount as a first predetermined torque and determine the hysteresis torque for the second and third relaxation amounts as a second predetermined torque. In this manner, the hysteresis torque may be the second predetermined torque when the second or the third relaxation amount is being used. The hysteresis torques for second and third relaxation amounts may be different.

Control may determine the disabling torque in step 464. In other words, control may adjust the torque threshold associated with the relaxation amount based on the hysteresis torque. For example only, control may determine the disabling torque as the torque threshold less the hysteresis torque. Control may determine whether the indicated torque is less than the disabling torque in step 468. If true, control may continue to step 472; if false, control may remain in step 468. In step 472, control may command disabling of the relaxation of the driveline 199. The torque converter clutch may thereafter be actuated to lock the torque converter 197.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, comprising:
   a torque determination module determining torque produced by an internal combustion engine;
   a control module setting a signal to an active state when the torque is greater than a predetermined torque and a slip amount between an engine output speed and a transmission input speed is zero, the control module further setting a slip amount signal based on the predetermined torque,
   wherein the predetermined torque corresponds to a potential vibration amount when the slip amount is zero;
   a transmission control module selectively increasing the slip amount above zero in response to the setting of the signal to the active state, the transmission control module selectively increasing the slip amount based on the slip amount signal; and
   a threshold determination module determining the predetermined torque based on a firing period between two consecutive firing events of cylinders of the engine and a gear ratio selected within a transmission.

2. The control system of claim 1 wherein the threshold determination module determines at least one other predetermined torque that corresponds to another potential vibration amount when the slip amount is zero, and
   wherein, when the torque is greater than more than one of the predetermined torques, the control module sets the slip amount signal based on a greatest one of the more than one of the predetermined torques.

3. The control system of claim 1 further comprising a hysteresis module determining a hysteresis torque based on the predetermined torque while the signal is in the active state,
   wherein the control module determines a disabling torque based on the hysteresis torque and the predetermined torque and selectively sets the signal to an inactive state when the torque is less than the disabling torque.

4. The control system of claim 3 wherein the transmission control module selectively adjusts the slip amount toward zero in response to the setting of the signal to the inactive state.

5. The control system of claim 3 wherein the hysteresis module determines the hysteresis torque further based on the firing period and an expected slip amount.

6. The control system of claim 1 wherein the torque determination module determines the torque based on a brake torque, frictional torque losses of the engine, pumping torque losses of the engine, and accessory loads on the engine.

7. The control system of claim 6 wherein the torque determination module determines the torque based on a sum of the brake torque, the frictional torque losses, the pumping torque losses, and the accessory loads.

8. The control system of claim 6 wherein the torque determination module determines the torque further based on an electric motor torque.

9. A control method for a vehicle, comprising:
   determining torque produced by an internal combustion engine;
   setting a signal to an active state when the torque is greater than a predetermined torque and a slip amount between an engine output speed and a transmission input speed is zero,
   wherein the predetermined torque corresponds to a potential vibration amount when the slip amount is zero;
   determining the predetermined torque based on a firing period between two consecutive firing events of cylinders of the engine and a gear ratio selected within a transmission;
   setting a slip amount signal based on the predetermined torque; and
   selectively increasing the slip amount above zero based on the slip amount signal in response to the setting of the signal to the active state.

10. The control method of claim 9 further comprising:
    determining at least one other predetermined torque that corresponds to another potential vibration amount when the slip amount is zero; and,
    when the torque is greater than more than one of the predetermined torques, setting the slip amount signal based on a greatest one of the more than one of the predetermined torques.

11. The control method of claim 9 further comprising:
    determining a hysteresis torque based on the predetermined torque while the signal is in the active state;

determining a disabling torque based on the hysteresis torque and the predetermined torque;

and selectively setting the signal to an inactive state when the torque is less than the disabling torque.

12. The control method of claim 11 further comprising selectively adjusting the slip amount toward zero in response to the setting of the signal to the inactive state.

13. The control method of claim 11 further comprising determining the hysteresis torque further based on the firing period and an expected slip amount.

14. The control method of claim 9 further comprising determining the torque based on a brake torque, frictional torque losses of the engine, pumping torque losses of the engine, and accessory loads on the engine.

15. The control method of claim 14 further comprising determining the torque based on a sum of the brake torque, the frictional torque losses, the pumping torque losses, and the accessory loads.

16. The control method of claim 14 further comprising determining the torque further based on an electric motor torque.

* * * * *